United States Patent [19]

Brown

[11] 4,183,421
[45] Jan. 15, 1980

[54] STEERING CONTROL FOR AN INTEGRATED BRAKE AND STEERING SYSTEM

[75] Inventor: Arthur K. Brown, South Bend, Ind.

[73] Assignee: The Bendix Corporation, Southfield, Mich.

[21] Appl. No.: 892,051

[22] Filed: Mar. 31, 1978

[51] Int. Cl.² ............................................. B62D 5/08
[52] U.S. Cl. .................................. 180/145; 91/375 A; 180/146
[58] Field of Search .............. 180/132, 141, 142, 143, 180/145, 148, 149, 150, 146; 60/548, 375; 91/391 R, 375 A; 74/422, 388 PS

[56] References Cited

U.S. PATENT DOCUMENTS

| | | | |
|---|---|---|---|
| 3,103,986 | 9/1963 | Barton et al. | 180/148 |
| 3,739,577 | 6/1973 | Nagase | 91/375 A |
| 3,887,027 | 6/1975 | Allison | 180/141 |
| 3,935,709 | 2/1976 | Mathues et al. | 91/391 R |

*Primary Examiner*—Joseph F. Peters, Jr.
*Assistant Examiner*—Randall A. Schrecengost
*Attorney, Agent, or Firm*—Leo H. McCormick, Jr.; Ken C. Decker

[57] ABSTRACT

A steering mechanism for use in an integrated brake and steering system. The steering mechanism has a driver gear connected to a rack mechanism by a pinion member. The driver gear is connected to a gear attached to a steering shaft by a linkage member. A carrier member attached to a rotary valve holds first and second sprocket wheels taut against the linkage member. A steering input signal applied to the steering shaft by an operator creates a steering torque in the linkage member. The steering torque causes the rotary valve to move and restrict the communication from a source of fluid to develop a pressure differential across the rack mechanism. This pressure differential moves the rack and provides the driver gear with an operational rotary torque. This operational rotary torque is transmitted by the linkage to the gear on the shaft to provide a power assist in the operation of the steering gear connected to the wheels of a vehicle.

6 Claims, 4 Drawing Figures

STEERING CONTROL FOR AN INTEGRATED BRAKE AND STEERING SYSTEM

BACKGROUND OF THE INVENTION

Hydraulic brake boosters, such as disclosed in U.S. Pat. No. 3,831,491, have been proposed for general use in vehicles because of their compactness and reliability. In such brake boosters, the input force from the operator, which is modified through a ratio changer, moves a valve to allow a proportional volume of fluid under pressure to actuate the wheel brakes of the vehicle.

In order to maintain the number of components attached to the drive train of the motor of the vehicle at a minimum, it was suggested as disclosed in U.S. Pat. No. 3,838,629, that a portion of the output of the pump that supplies the power steering gear be diverted to operate the hydraulic brake booster.

In a further effort to better utilize the space available under the hood of vehicles, U.S. Pat. No. 4,072,011 discloses a single housing for retaining both a hydraulic brake booster and a power steering gear. A flow control valve in the housing, in response to a brake actuator signal, diverts a portion of the output of the pump away from the rotary valve in the steering gear to provide the hydraulic brake booster with a power assist.

In another integrated brake and steering system, as disclosed in U.S. patent application Ser. No. 832,135, a single valve was adapted to operate in translatory and rotational modes to control the communication of presurized fluid to a valve system and/or a steering system corresponding to independent operator brake and steering signals.

In another integrated brake and steering system, as disclosed in U.S. patent application Ser. No. 882,716, an integral control mechanism was developed having a rotary valve for regulating the communication of fluid to the steering system concentrically located in a spool valve that regulated the communication of fluid to the brake system.

Even though the known integrated brake and steering mechanisms performed in an adequate manner, because of space limitations between the steering shaft and brake pedal linkage, they have not been universally accepted for all vehicles.

SUMMARY OF THE INVENTION

I have devised a steering assist mechanism for use in an integrated brake and steering system having a linkage mechanism for providing a remotely positioned steering shaft with a rotational force in response to an operator steering signal.

The steering assist mechanism has a driver gear connected to a movable piston member by a rack and pinion arrangement. A chain links the driver gear with a gear fixed to the steering shaft. A carrier member has first arm and a second arm attached to a rotary valve for holding first and second sprockets, respectively, in contact with the chain.

A steering signal applied to the steering shaft by an operator puts tension on the chain between the gear on the steering shaft and one of the first and second sprockets. The tension on the chain causes the carrier member to rotate the rotary valve and restrict the communication of fluid from a source to develop a pressure differential across the piston. When the pressure differential reaches a predetermined level, the piston moves a rack to produce a rotational torque in a pinion. Thereafter, this rotational torque is transmitted through the chain to the gear on the steering shaft to provide a power assist in the operation of the steering gear connected to the wheels of the vehicle.

It is an object of this invention to provide an integrated brake and steering system with a steering mechanism to augment a manual steering signal in the operation of a steering gear connected to the wheels of a vehicle.

It is another object of this invention to provide a rotary valve in a steering mechanism with an actuator mechanism responsive to the tension in a chain through which an operational power assist is transmitted to a steering shaft. This operational power assist and a manual steering input is transmitted into a steering gear through the steering shaft which controls the movement of the wheels of a vehicle.

These and other objects should be apparent from reading this specification and viewing the drawings.

DETAILED DESCRIPTION OF THE INVENTION

Figure 1:
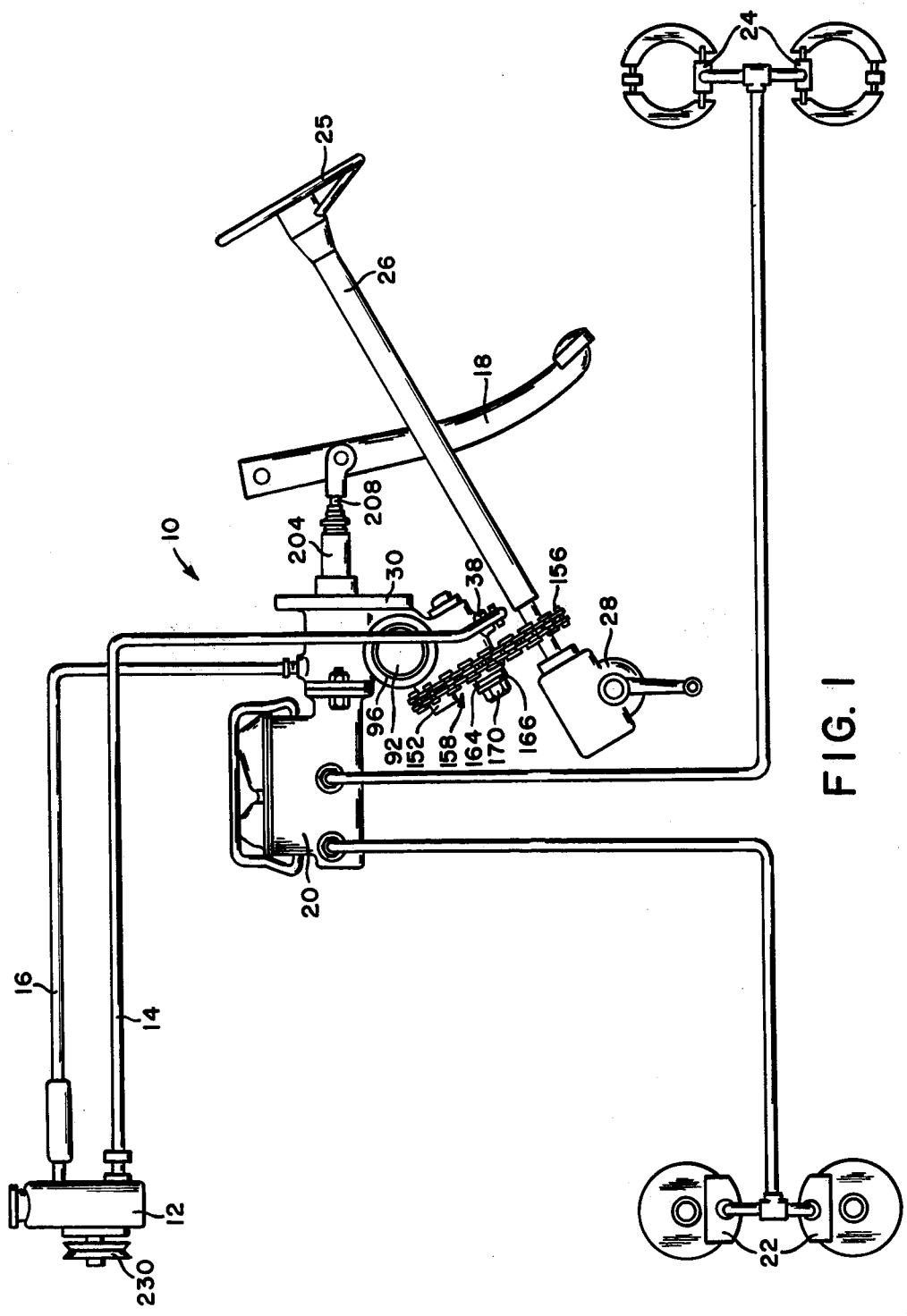
FIG. 1 is a schematic illustration of a control mechanism made according to the teachings of this invention in an integrated brake and steering system of a vehicle.

The integrated brake and steering sytems shown in FIG. 1 has a control mechanism 10 which is connected to a hydraulic pump 12 by a supply conduit 14 and a return conduit 16.

In response to a brake input force applied to brake pedal 18 by an operator, the control mechanism 10 is operated to provide master cylinder 20 with an input force sufficient to effect a brake application of the front and rear wheel brakes 22 and 24, respectively.

In response to a steering input force applied to the steering shaft 26, the control mechanism 10 is operated to provide an additional rotative force to operate the steering gear 28 and correspondingly move or turn the wheels of the vehicle.

Figure 2:
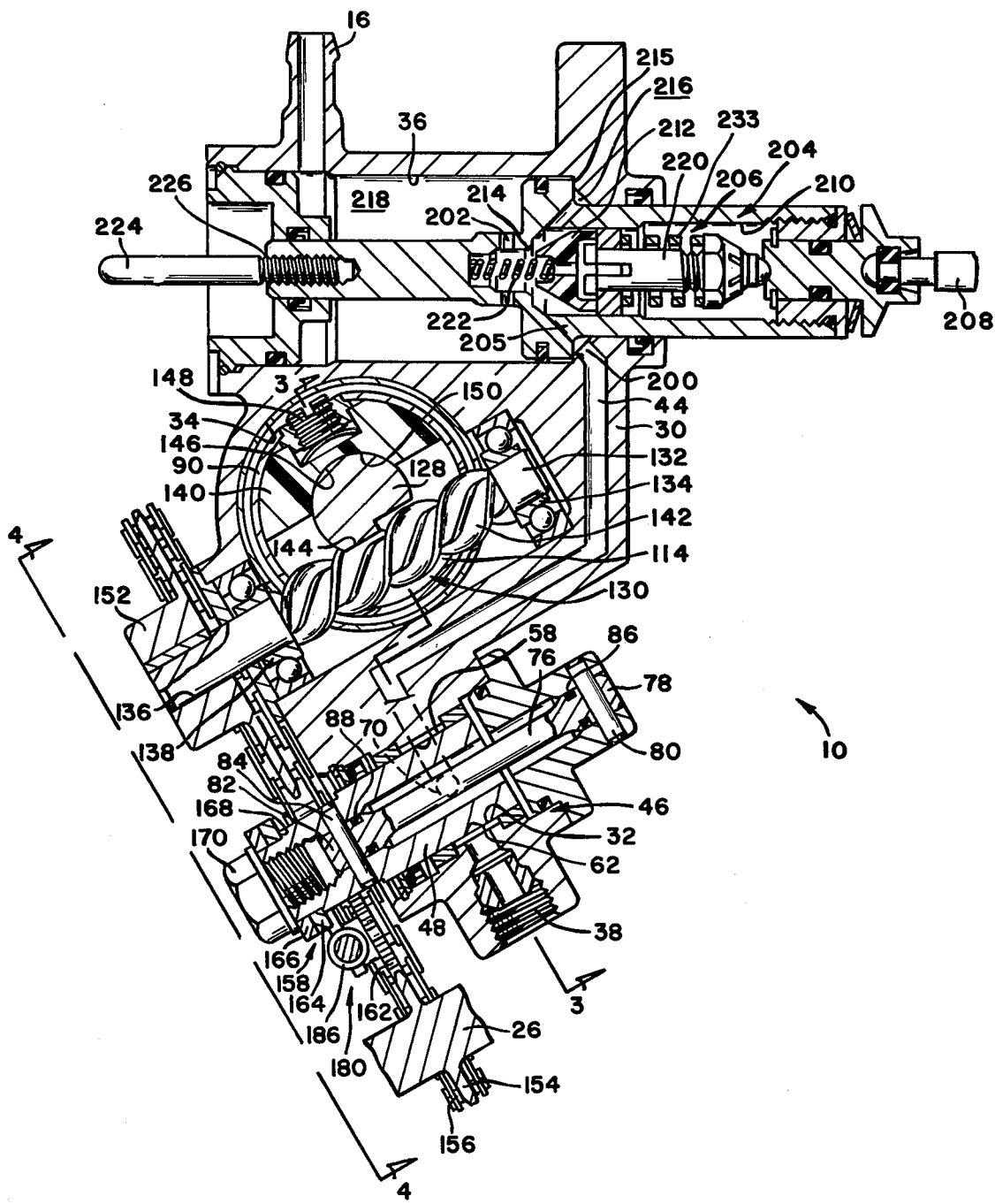
FIG. 2 is a sectional view of the control mechanism taken along line 2—2 of FIG. 1.

In more particular detail, as shown in FIG. 2, the control mechanism 10 has a housing 30 with a first bore 32, a second bore 34 and a third bore 36 located therein. The first bore 32 is connected to the supply conduit 14 by port 38, to the second bore 34 through passageways 40 and 42, see FIG. 3, and to the third bore 36 through passageway 44.

A rotary valve member 46 located in the first bore 32 regulates the communication of the fluid from port 38 to the first, second and third passageways 40, 42 and 44, respectively.

Figure 3:
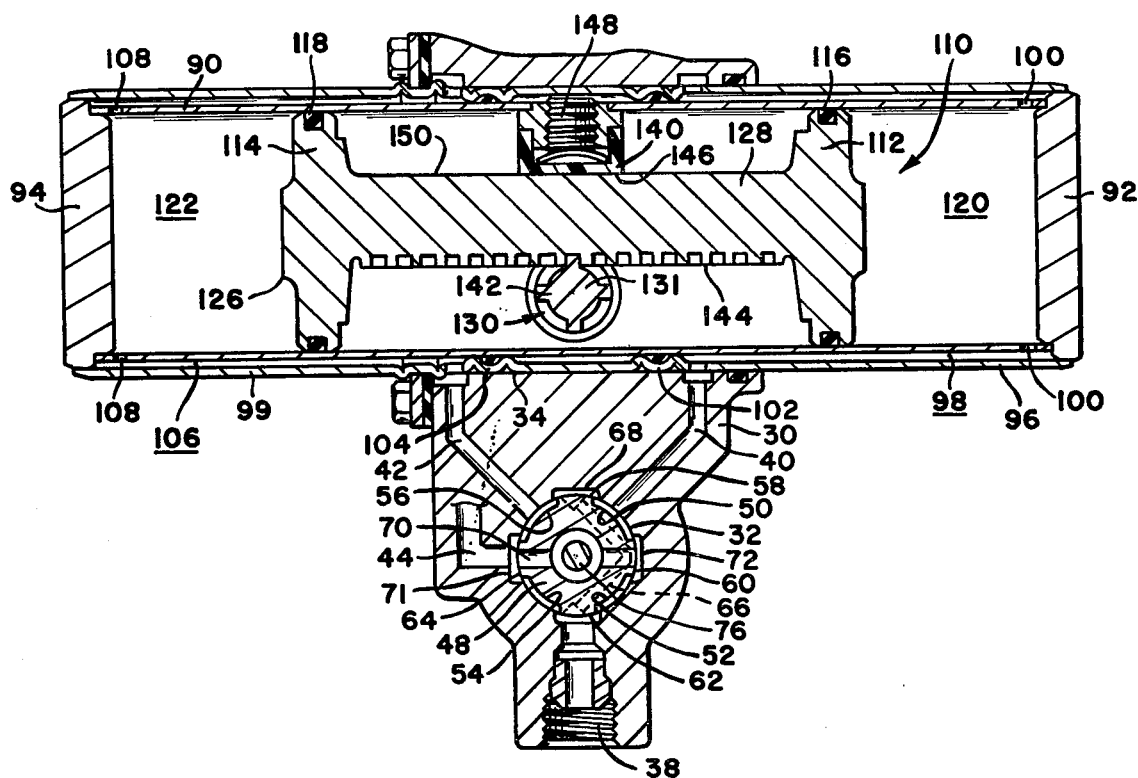
FIG. 3 is a sectional view taken along line 3—3 of FIG. 2.

The rotary valve member 46 includes a sleeve 48 which has a series of slots 50, 52, 54 and 56 located between ribs 58, 60, 62 and 64, see FIG. 3, a first cross bore 66 which connects port 38 with cavity 68 in housing 30 adjacent bore 32, and a second cross bore 70 that connects return passage 72 with the third passageway 44. A torsion bar 76 has a first end 78 fixed to housing 30 by a pin 80 and a second end 82 fixed to the sleeve 48 by pin 84. Seals 86 and 88 which surround the torsion bar 76 prevent fluid, which flows from return passage 72 to the third passageway 44 through cross bore 70, from leaking to the surrounding environment. The torsion bar 76 normally holds the sleeve 48 in a position as illustrated in FIG. 2, such that fluid flows from port 38 through cross bore 66 to cavity 68. The volume of fluid in cavity 68 is divided with approximately one-half flowing to groove 58 and the other half flowing to groove 56 for communication to the second bore 34 through passageways 40 and 42, respectively.

A tubular member or sleeve 90 is positioned and held in bore 34 by end caps 92 and 94 attached to projections 96 and 99, respectively, extending from housing 30. Sleeve 90 cooperates with projection 96, rib 102 and end cap 92 to establish a flow path 98 between passage 40 and radial openings 100 adjacent end cap 92, and with projection 99, rib 104 and end cap 94 to establish a flow path 106 between passageway 42 and radial openings 108 adjacent end cap 94.

A piston 110 having a first cylindrical member 112 separated from a second cylindrical member 114 by rack 128 is located within the sleeve 90. The first cylindrical member 112 cooperates with sleeve 90 and end cap 92 to define a first chamber 120 while cylindrical member 114 cooperates with sleeve 90 and end cap 94 to define a second chamber 122 within the housing 30. Cylindrical members 112 and 114 have bumpers 124 and 126 located thereon which engage end caps 92 and 94, respectively, and prevent the interruption of fluid communication to chambers 120, 122 from flow paths 98 and 106 during movement of the piston 110 within the sleeve 90. Seals 116 and 118 on cylindrical members 112 and 114, respectively, prevent communication of fluid between the first chamber 120 and the second chamber 122.

A pinion member 130 has a shaft 131 with a first cylindrical portion 132 journalled in bearing 134 fixed in housing 30 and a second cylindrical portion 136 which extends through bearing 138 to a position external to housing 30. The pinion member 130 has a plurality of teeth 142 which mesh with teeth 144 on the rack 128 to convert linear movement of the piston 110 into rotary movement of the pinion shaft 131.

An indexing member 140 which is attached to sleeve 90 by screw 148 has a face 146 that engages surface 150 of rack 128. The indexing member 140 holds teeth 144 into engagement with teeth 142 to prevent stripping of these teeth by bowing of the rack 128 during movement of the piston 110 by the difference in fluid pressure between the first chamber 120 and the second chamber 122.

Figure 4:
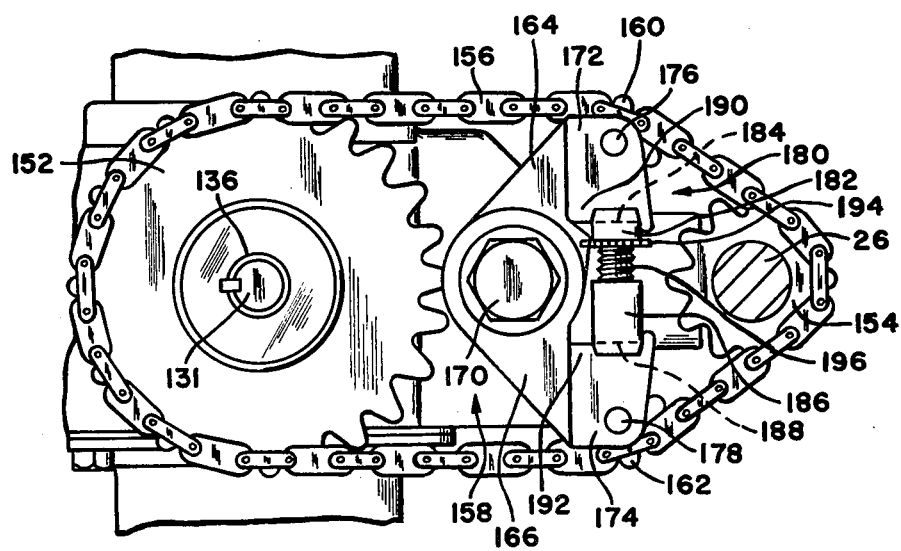
FIG. 4 is a view taken along line 4—4 of FIG. 2.

A driver gear 152, as best shown in FIG. 4, which is fixed to the end of the second cylindrical portion 136 of shaft 131 transfers rotary movement of the pinion member 130 to gear 154 fixed to the steering shaft 26 through chain 156.

A carrier member 158 which is fixed to the rotary valve 46 holds sprockets 160 and 162 taut against the chain 156 to assure that movement of gear 152 is directly transferred to gear 154 on shaft 26.

The carrier member 158 has a first arm 164 and a second arm 166 positioned against shoulder 168 on sleeve 48 by threaded stud 170. The end 172 of the first arm 164 is offset with respect to shoulder 168 in order that sprocket 160 is aligned with chain 156. Similarly end 174 is offset with respect to shoulder 168 in order to align sprocket 162 with chain 156.

Sprockets 160 and 162 are attached to arms 164 and 166, respectively by pins 176 and 178.

A tensioning member 180 as best shown in FIG. 4, has a first cylindrical member 182 with a slot 184 on the end thereof and a second cylindrical member 186 with a slot 188 located on the end thereof. A projection 190 on arm 164 is located in slot 184 and a projection 192 on arm 166 is located in slot 188. A pawl wheel 194 on threaded stem 196 which is attached to cylindrical member 186 has internal threads therein. By moving pawl wheel 194 with respect to cylindrical member 186 the sprocket wheels 160 and 162 increase the tension on chain 156 as arms 164 and 166 pivot on sleeve 48. When the desired tension is achieved and slots 58 and 62 are centered with respect to port 38 and chamber 68, stud 170 is tightened to fix the position of the arms 164 and 166 with respect to the rotary valve 46 to allow fluid from the pump to freely flow from port 38 to passage 44 in the absence of a steering signal.

The fluid in passage 44 enters bore 36 through port 200 and passes through passages 202 in piston 204 before returning to the reservoir in pump 12 by conduit 16.

Flow of fluid through passage 202 is regulated by the brake control valve 206 which is fully disclosed in U.S. Pat. 3,967,536 is connected to push rod 208 attached to the brake pedal 18.

Control valve 206 has a poppet member 212 connected to push rod 208 through bolt 220 of a spring cage mechanism 213. Return spring 222 connected to piston 204, holds the poppet 212 away from seat 214 to allow the fluid to freely flow into chamber 218 from chamber 216. Piston 204 is attached to push rod 224 through a threaded connection 226.

MODE OF OPERATION OF THE INVENTION

When the engine in a vehicle equipped with a pump 12 is operating, a belt from the crankshaft continually rotates pully 230 to produce a fluid flow in supply conduit 14.

The fluid in conduit 14 is presented to port 38 in the control mechanism 10 through which the brake and steering systems in the vehicle are provided with a power assist.

The fluid flows through port 38 around rib 62 along a first flow path to passageway 44 and through cross bore 66 in a second flow path to passageway 44.

In the first flow path, fluid flows through either slot 52 to cross bore 70 or slot 54 for communication to return cavity 71.

In the second flow path, the fluid in cavity 68 flows around rib 58 for distribution through slot 50 to passageway 40 and slot 56 to passageway 42. With the flow of fluid from cavity 68 unrestricted, the fluid pressure in chambers 120 and 122 are equal. The entire fluid flow from cavity 68 flows through either slot 56 to return cavity 71 or slot 50 to cavity 72 for distribution to return cavity 71 through cross bore 70.

Thus, the same volume of fluid that enters port 38 is flowing in passageway 44 to the control valve 206. The fluid enters bore 36 by flowing into chamber 216 through port 200. Piston 204 has a series of passages 205 through which the fluid is communicated to passage 202 to chamber 218 for return to the reservoir by conduit 16.

When the operator desires to effect a brake application, an input force applied to brake pedal 18 is transmitted through push rod 208 to the control valve 206. Movement of the control valve restricts the flow of fluid through passage 202 by moving poppet 212 toward seat 214 causing a pressure differential to occur between chambers 216 and 218. This pressure differential acts on piston face 215 and moves the piston 204 toward chamber 218. When piston 204 moves toward chamber 218, a force is developed and transmitted through push rod 224 to operate the master cylinder 20 and provide the front and rear wheel brakes 22 and 24 with pressurized fluid to effect a brake application.

When sleeve 48 is rotated, the flow communication from port 38 through cavity 68 is restricted to one of the passages 40 and 42 while the other of the passages 40 and 42 is opened to receive the full pump pressure. However, the passage through which the flow from cavity 68 is restricted, is proportionally opened to passage 44 going to the reservoir.

The full pump pressure, is transmitted through one of passages 40 and 42 depending on the direction desired to turn, 42 for left and 40 for right, to the corresponding pressure chamber 120 or 122. Since the pump pressure is on one side of the piston 110 and the other side is communicated to the reservoir, a pressure differential is created. This pressure differential acts piston 110 and moves the piston 110 toward the chamber in free communication with the reservoir through passage 44. When piston 110 moves, teeth 144 on rack 128 engage teeth 142 and rotate pinion 130. Rotation of pinion 130 causes gear 152 to rotate and provide chain 156 with an operational force. This operational force is transmitted through chain 156 to gear 154 to provide shaft 26 with a power assist in operating steering gear 28 that turns the wheels of the vehicle.

Assume that the piston 110 and the sleeve 48 are each in neutral positions relative to the housing 30, as shown in FIG. 3. With sleeve 48 and piston 110 in this neutral position, the fluid pressure in chambers 120, 122 is balanced. Should the operator desire to make a change in the direction the vehicle is traveling, a steering input is applied by rotating steering shaft 26 and gear 154 through wheel 25. Since gear 152 is initially stationary, the rotation of gear 154 produces tension in one portion of chain 156 and slack in the other portion. For example, if gear 154, when viewed as in FIG. 4, is rotated counterclockwise, this rotation produces tension in the portion of chain 156 which engages sprocket 162 and arm 166 while producing slack in the portion of chain 156 which engages sprocket 160 and arm 164. This tension acts on arm 166 to cause counterclockwise rotation of stud 170 and thus, sleeve 48, to an angularly displaced position relative to housing 30, against the resilient tension of torsion bar 76.

It should be noted that the tension in chain 156 does not merely produce a force which acts on arm 166 in a direction parallel to chain 156 since sprocket 162 would freely rotate in response to such a force without arm 166 pivoting at stud 170. Instead, the tension in chain 156 produces a force which acts on arm 166 in a direction normal to the portion of chain 156 which engages sprocket 162. It is a vector component of this normal force which causes arms 166 and 164 and stud 170 to rotate counterclockwise.

The counterclockwise rotation of sleeve 48 to its angularly displaced position opens passage 40 to inlet 38 while opening passage 42 to the outlet passage 44. This causes a differential pressure in chambers 120, 122 which moves piston 110 to the left to a displaced position relative to housing 30, when viewed as in FIG. 3. This movement of piston 110 provides the power assist in the steering system through the counterclockwise rotation of pinion 130 on rack 144. The counterclockwise rotation of pinion 130 produces counterclockwise rotation of gear 152, when viewed as in FIG. 4.

This counterclockwise rotation of gear 152 relieves the tension in the portion of chain 156 which engages sprocket 162 and arm 166. The relief of the chain tension eliminates the normal force on sprocket 162 and arm 166 which caused their initial counterclockwise rotation. Then, under the influence of torsion bar 76, arms 164, 166, stud 70 and sleeve 48 rotate clockwise back to their initial neutral position with respect to housing 30, even though gears 152, 154 and chain 156 are displaced counterclockwise from their initial positions. If sprockets 160, 162 were not allowed to rotate freely about pins 176, 178, on arms 164, 166, then this clockwise rotation of sleeve 48 in response to counterclockwise rotation of gear 152 would not be possible.

When sleeve 48 has returned to its initial neutral position with respect to housing 30, the fluid pressure in chambers 120, 122 is once again balanced. This pressure balance maintains piston 110, gear 152, chain 156 and gear 154 in their displaced positions until the vehicle operator applies a new steering signal by rotating shaft 26 to yet another position.

I claim:
1. In a vehicle having an integrated fluid power-assisted braking and steering system, a steering mechanism comprising:
   a housing having first and second bores therein, means for communicating said first bore with a fluid pressure source, a pair of operational passages for communicating said first bore with said second bore, and an outlet passage for communicating said first bore with said braking system;
   a piston movable in said second bore and cooperating with said housing to form a pair of pressure chambers, each of said chambers communicating with a respective operational passage;
   a first gear for rotating in response to an operator steering signal;
   a second gear connected to said piston and rotating in response to movement of said piston;
   linkage means for interconnecting said first and second gears;
   a rotary valve member in said first bore for rotating to regulate said fluid pressure within said first and second pressure chambers, said valve member including lands, slots, and passages which cooperate with a wall of said first bore to create a restrictive flow condition between said fluid pressure source and one of said operational passages, said restrictive flow condition producing a pressure differential between said first and second pressure chambers;
   actuator means for pivoting in response to tension produced in said linkage means, said tension being produced in response to rotation of said second gear relative to said first gear, said rotary valve member rotating in response to pivoting of said actuator means from a neutral position to an angularly displaced position with respect to said housing to create said restrictive flow condition and said pressure differential, said piston moving in response to said pressure differential from a neutral position to a displaced position with respect to said housing to provide a power assist in the operation of said steering system; and
   a torsion bar with one end fixed relative to said housing and another end fixed relative to said rotary valve member, said second gear rotating in response to said movement of said piston to eliminate said tension in said linkage means to allow said torsion bar to return said rotary valve to said neutral position with respect to said housing to eliminate said pressure differential and to thereby maintain said piston in said displaced position until another operator steering signal is applied to said first gear.

2. The steering mechanism of claim 1, wherein: said housing includes a sleeve member concentrically surrounding said piston in said second bore, said sleeve member cooperating with said housing to define flow path extensions for said operational passages, said sleeve member having radial openings adjacent the ends thereof for connecting each of said flow paths with a respective one of said pressure chambers.

3. The steering mechanism of claim 1, wherein said actuator means comprises:
a pair of arms extending from said rotary valve member, each of said arms including a sprocket rotatably mounted on the end thereof for engaging respective portions of said linkage means between said first and second gears, said sprockets allowing said arms and said rotary valve member to return to said neutral position under the influence of said torsion bar as said piston moves to said displaced position.

4. The steering mechanism of claim 3, wherein: said actuator means includes an adjuster for adjusting the separation of said ends of said arms.

5. The steering mechanism of claim 1, wherein said rotary valve member comprises:
a cylindrical sleeve concentrically mounted on said torsion bar, said sleeve including an annular groove on the outer peripheral surface thereof for providing uninterrupted communcation of said fluid pressure to said outlet.

6. The steering mechanism of claim 1, wherein: a rack on said piston engages a pinion connected to said second gear so that said second gear rotates in response to translation of said piston.

* * * * *